United States Patent [19]

Miller et al.

[11] 4,038,494
[45] July 26, 1977

[54] DIGITAL SERIAL TRANSMITTER/RECEIVER MODULE

[75] Inventors: George W. Miller, Anoka; Mark D. Ryan, Fridley; Bill H. Niemi, Brooklyn Park, all of Minn.

[73] Assignee: FMC Corporation, San Jose, Calif.

[21] Appl. No.: 587,777

[22] Filed: June 17, 1975

[51] Int. Cl.² ............................................. H04B 1/16
[52] U.S. Cl. .................................... 178/69.1; 325/58
[58] Field of Search ................. 343/179; 178/69.5 R, 178/53; 325/58, 42; 179/15 BS; 340/147 SY

[56] References Cited
U.S. PATENT DOCUMENTS

| | | | |
|---|---|---|---|
| 3,593,140 | 7/1971 | Kaneko | 325/13 |
| 3,614,622 | 10/1971 | Holsinger | 325/42 |
| 3,697,690 | 10/1972 | Aaron | 178/69.5 R |
| 3,742,199 | 6/1973 | Lubarsky | 178/69.5 R |
| 3,742,360 | 6/1963 | Ragsdale | 325/42 |
| 3,747,067 | 7/1973 | Fox | 178/69.5 R |
| 3,863,025 | 1/1975 | Gonsiewski | 178/69.5 R |
| 3,872,437 | 3/1975 | Cross | 178/69.5 X |
| 3,903,504 | 9/1975 | Rogers | 178/69.5 X |

Primary Examiner—Harold I. Pitts
Attorney, Agent, or Firm—R. S. Kelly; C. E. Tripp

[57] ABSTRACT

A transmitter/receiver module which includes circuitry for receiving serial digital data in diphase non-return-to-zero (NRZ) format and for demodulating said data into a separate synchronizing signal, data signal and clock signal and which further includes circuitry for transmitting the received and modulated signal or other modulated signals input directly to the module, such /transmitting circuitry including means for modulating the clock signal, data signal and synchronizing signal into the prescribed diphase NRZ format for output through a transformer coupled transmission line. The module further includes an oscillator for realigning the clock signal received with the serial digital data.

14 Claims, 5 Drawing Figures

FIG_1

FIG_2

FIG_5

DIGITAL SERIAL TRANSMITTER/RECEIVER MODULE

BACKGROUND OF THE INVENTION

1. Field of the Invention

The present invention pertains to the wire transmission of serial digital data, and more particularly, it pertains to transmitter/receiver modules capable of both modulating and demodulating serial digital data for sending or receiving said data.

2. Description of the Prior Art

During the past twenty years or so there has been a continuous reduction in the size, weight, and cost of signal processor functional elements of more than three orders of magnitude while the communication technology used to integrate electronic systems has remained essentially unchanged. With the increased demands being placed on digital hardware and the greater functional densities of the processors required for interfacing, the resulting proliferation of cabling and switching hardware is reaching prohibitive levels.

Consequently, there presently exists a need for a pulse coded binary digital data transmission system which can operate by means of a series of data links interconnected by universally adaptable transmitter/receiver modules. These modules—which form the heart of any such data transmission system, must be capable of readily interfacing with existing digital signal hardware, and they must be both inexpensive to manufacture and yet highly reliable in providing a variety of useable processing functions.

In the prior art systems, the circuitry for transmitting and receiving serial digital data are generally either entirely separate or they are keyed to the particular equipment for which they were designed to be interfaced with. No successful transmitter/receiver module for handling serial digital data of the type processed by the apparatus of the present invention is currently available.

SUMMARY OF THE INVENTION

The transmitter/receiver, or transceiver, module of the present invention comprises a single compact unit which presents standard input and output interfaces to subscriber equipment. This transceiver module permits simultaneous two-way data flow in serial digital form at rates up to 10 megabits per second.

The receiver section operates to separate the high frequency digital signal that is received into three separate signal elements including a clock signal, a data signal and a synchronizing (or framing) signal. These signals are extracted from the received signal, and a local oscillator, which is a part of the transceiver module, is used to realign the clock signal so that the data transmitted from or directly output from the module will have a "clean" clock free from transmission-induced errors.

In the transmitting portion of the transceiver module of the present invention, a separate clock signal, data signal and synchronizing signal, either received directly by the module itself or derived from the received serial digital data signal, are reformed into a single polar diphase signal and transmitted over a two-wire transmission line in a baseband transmission mode.

The transmitter/receiver module of the present invention is capable of (1) receiving a pulse coded binary digital data signal, demodulating it and transmitting separate clock, sync and data signals to an alternate transceiver module or to a local subscriber; (2) receiving said pulse coded binary digital data signal, demodulating it, realigning the clock signal, and retransmitting the signal to a distant point; or (3) receiving locally produced digital signals, modulating the signals into an appropriate digital data signal transmission format, and transmitting it to said distant point.

DESCRIPTION OF THE PREFERRED EMBODIMENT

Figure 5:
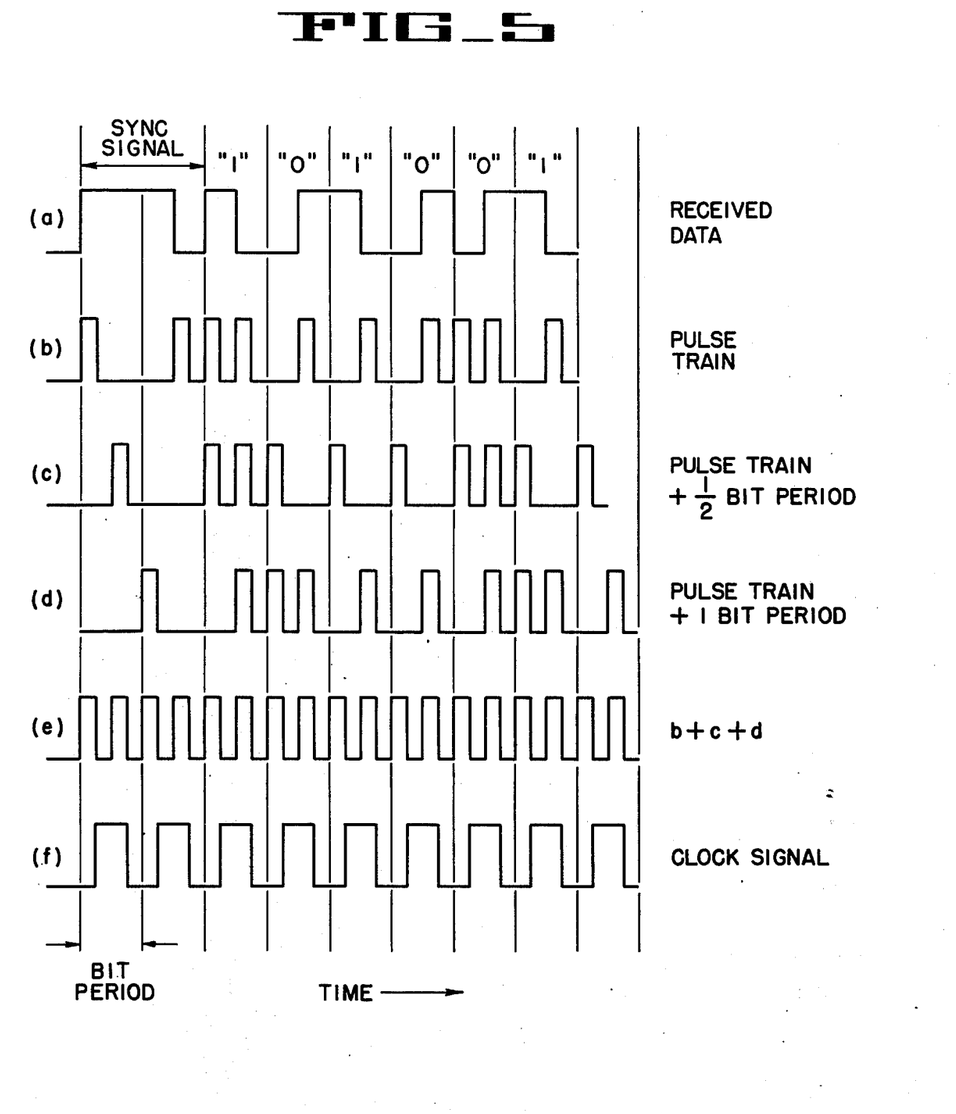
FIG. 5 is a timing diagram illustrating the received digital data signal and the method whereby the clock signal is synthesized therefrom.

In accordance with the present invention, the transmitter/receiver module is designed to receive and transmit serial digital data in a baseband transmission format. The digital data signal which is to be transmitted and received is of the pulse coded binary type and in the diphase non-return-to-zero format. This conventional type of digital signal is shown in (a) of FIG. 5 wherein it will be seen that the data signal comprises a series of bit periods with the data signal either rising (to indicate a logic 0) or falling (to indicate a logic 1) at exactly the mid-point of the bit period. Thus, the data has equal excursions about the neutral (ground) point so that no DC is transmitted on the transmission line. This permits the use of transformers to provide DC isolation of the transmission lines to prevent ground loop currents from degrading the transmitted or received data. Also as seen in FIG. 5(a), the synchronizing (sync) signal, which frames the data bits, is comprised of a unique "high" signal for 1½ bit periods, and, in order to prevent DC from being introduced, the proceding bit period prior to the sync signal must be "low".

In the present case, the bit period will be taken as 100 nanoseconds whereby the data will be received at a 10 megahertz rate.

Figure 1:
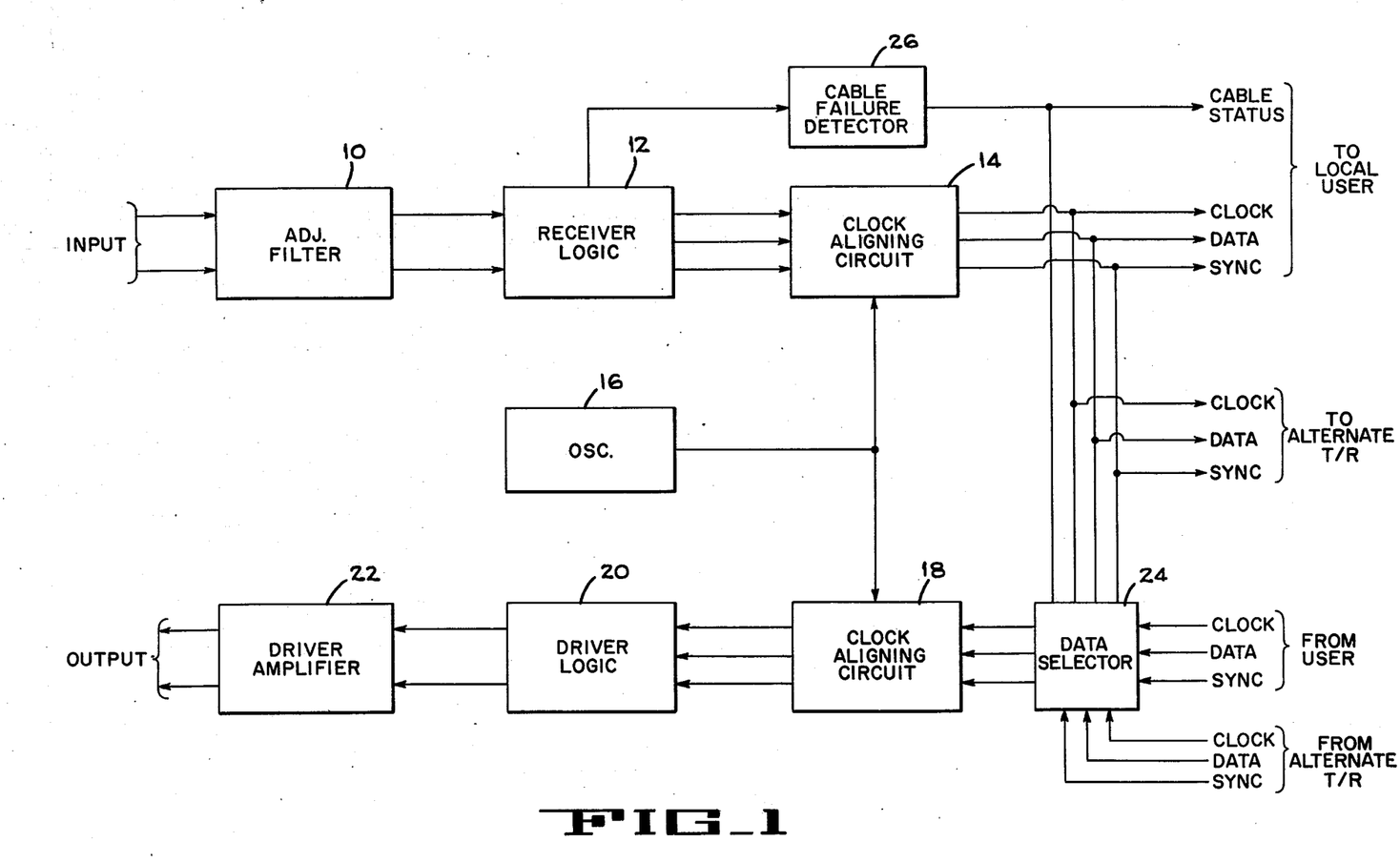
FIG. 1 is a block diagram illustration of the functional components of the transmitter/receiver module of the present invention.

Referring now to FIG. 1, the basic functional components of the transmitter/receiver (T/R) module of the present invention are these shown in block diagram form. Thus, the T/R includes an adjustable filter 10 which receives the incoming serial digital data transmission and operates as a gain control means so that a fairly uniform signal level will be delivered to the receiver logic circuitry 12 where it is demodulated and separated into a data signal, a clock signal (which is derived from the data), and a sync signal which frames the data information bits. The three separate signals are transmitted to a clock aligning circuit 14 where they are rephased with a new clock, or oscillator, 16 which is running at essentially the same frequency as the data clock but at a differing and undetermined phase relationship. By this means, any jitter introduced into the data clock on the transmission line due to varying bit patterns will not be accumulated between data links, i.e., from one T/R module to the next. Circuitry which may be used to provide the clock aligning function is shown and described in the copending U.S. patent application Ser. No. 587,778 of Bill H. Niemi et al., entitled Clock Phasing Circuit and filed on even date herewith. This copending patent application is hereby specifically incorporated in the present description, and reference to such application may be had a more detailed description of the clock phasing circuitry; such circuitry will not be described in further detail herein.

The driving, or output, side of the T/R module of the present invention also includes a clock aligning circuit 18 which is similar in all respects to the previously mentioned clock aligning circuit 14 and which is fully disclosed in the copending United States patent application Ser. No. 587,778, now U.S. Pat. No. 3,980,820 issued Sept. 19, 1976 mentioned hereinbefore. Thus, while the receiving side of the T/R module is transmitting data to a local user, the driving side of the T/R module can be used to transmit received data from the user or from an alternate T/R, or it can be used to simultaneously modulate the data and send it back down a separate output line. Thus, data from the clock aligning circuit 18 is transmitted to a driver logic circuit 20 wherein the clock, data, and sync signals are combined into a continuous serial digital data signal which is amplified in a driver amplifier circuit 22 and sent out over the output transmission line.

A data selector 24, which is of entirely conventional circuitry and will not be described in detail herein, can be utilized to (1) switch the received and modulated data to the driving side of the module and thereby retransmit it down another data link (in this case the clock aligning circuit 18 becomes superfluous); (2) switch modulated data from a local user or subscriber of the T/R to the driving side of the module; or (3) switch modulated data from an alternate T/R to the driving side of the T/R module.

Figure 2:
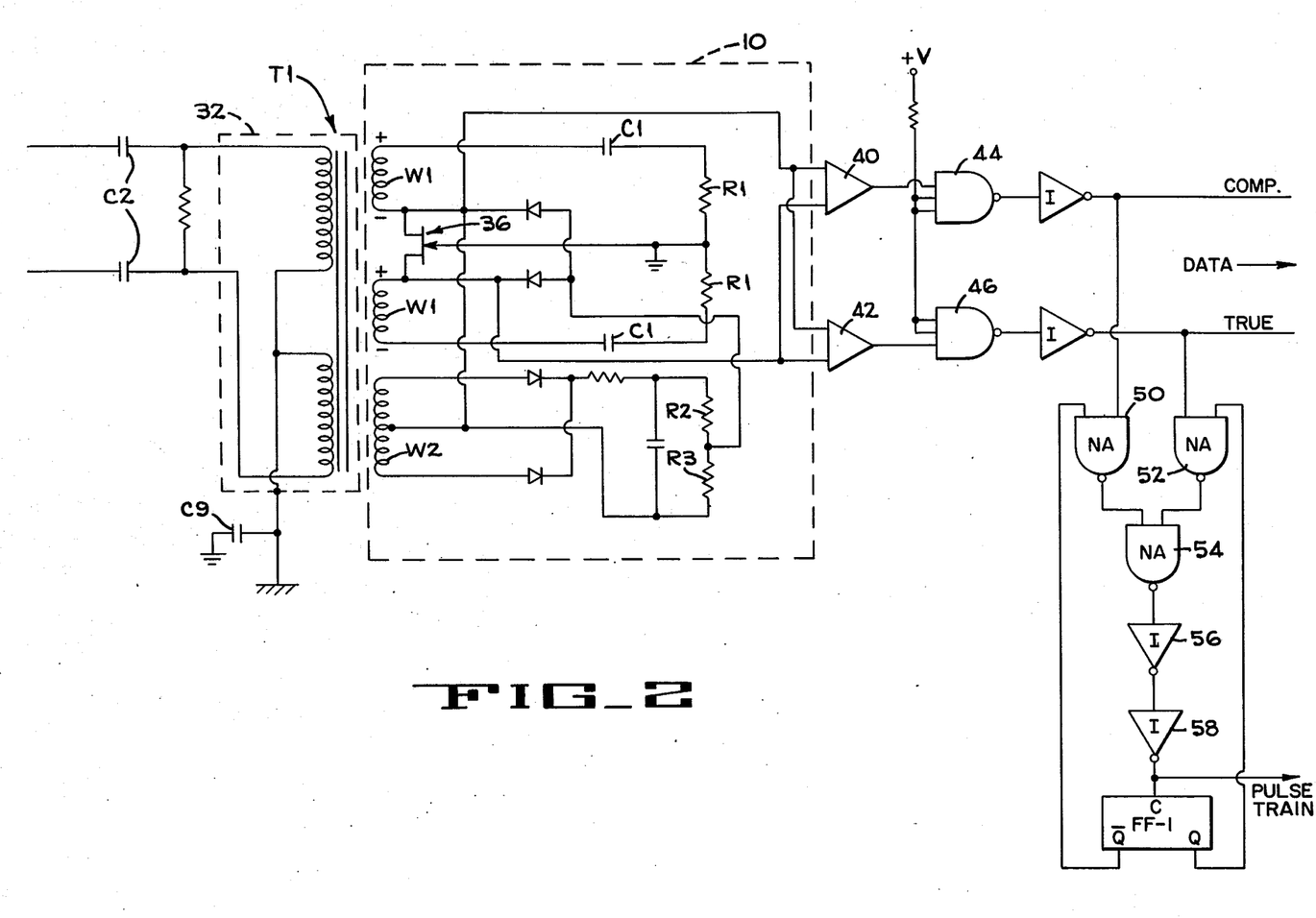
FIG. 2 is a schematic diagram of the adjustable filter and a portion of the receiver logic circuitry module of FIG. 1.

As shown in FIG. 2, the serial digital data is arranged to be received from its two-wire transmission line through decoupling capacitors C2 and applied to the grounded centertap primary winding of a transformer T1. The primary winding is provided with a shield 32 which is grounded to the casing of the T/R module as shown, with the circuit ground being also grounded to the casing through a capacitor C9 so that no ground loop currents will be present to affect the integrity of the transmitted data.

The secondary of transformer T1 includes a pair of windings W1 separate by a field effect transistor, or FET, 36 and a secondary winding W2 and forms a part of the adjustable filter circuit 10 previously mentioned. The adjustable filter generally is comprised of a pair of back-to-back, adjustable RC filter circuits with each circuit operating on one-half of the bi-polar digital signal. Each filtering circuit includes the serial combination of one of the windings W1, a capacitor C1, a fixed resistor R1, and the variable resistance provided by the base to source (or drain) connection of the FET 36. The voltage divider network comprised of resistors R2 and R3 in the fullwave rectifier from the secondary winding W2 provides a signal voltage at both the source and drain of the FET 36 as shown. With the signals across the FET (i.e., at the opposite polarity ends of the windings W1) being provided to a pair of differential amplifiers 40 and 42 at the output of filter circuit 10, it will be recognized that the adjustable filter operates in a manner so that as the input signal strength is increased or decreased the resistance value in the RC filter circuits will be varied due to the changing resistance value introduced by the FET. This has the effect of shifting the gain-frequency response curve of the RC filters so that as the signal strength increased the frequency response drops off to substantially equalize the outputs provided on the lines to the differential amplifiers 40 and 42. Conversely, as the signal strength decreases, the gain-frequency response curve is shifted relative to the signal frequency so that the response moves up the curve to boost the output signal to the differential amplifiers. Thus, differences in signal strength, which could be introduced due to various external factors affecting the transmission line, are compensated for to preserve the integrity of the data.

The differential amplifiers 40 and 42 receive the opposite polarity signals from the adjustable filter 10 and, in conjunction with NAND gates 44 and 46, operate to convert the bi-polar signals to ground reference logic levels. Logic level voltage +V is applied to the free inputs of gates 44 and 46, with the remaining inputs being connected to the outputs of the differential amplifiers 40 and 42, respectively, so that the data is transmitted as shown in FIG. 2 in complementary and true form to the remaining portion of the receiver logic circuitry.

In order to retrieve the clock from the data it is necessary to first provide a clock which operates at twice the frequency of the data clock, i.e., a 20 megahertz clock must be developed. Thus, from FIG. 2, it will be seen that the complementary and true data signals are provided as inputs to a pair of NAND gates 50 and 52. The outputs of these NAND gates are connected to a NAND gate 54 which is, in turn, serially connected to inverters 56 and 58 and the clock input of a flip-flop FF-1. The Q and Q̄ outputs of flip-flop FF-1 are provided as the second inputs of the NAND gates 50 and 52 respectively. This logic circuitry operates to provide 25 nanosecond output pulses each time that there is a transition in the data pattern, such transitions occurring at either 100 nanosecond or 50 nanosecond intervals (or at a 150 nanosecond interval during transmission of the sync bit). As the data signal falls or rises, one of the NAND gates 50 or 52 will be enabled to cause a high signal at the clock input of the flip-flop FF-1 which will drop approximately 25 nanoseconds later as the outputs Q and Q̄ of FF-1 are reversed so as to change the status of the outputs from gates 50 and 52. The 25 nanosecond period is determined by the delay times created by passing the resetting signal through the logic network, (FF-1, 50, 52, 54, 56 and 58). Thus, a 20 megahertz pulse train is delivered but with certain bits missing. For example, when successive 1-0-1-0 bit patterns are generated in the data, the received signal drops to 5 megahertz from the basic 10 megahertz and, thus, every other pulse will be missing from the pulse train. Also, in order to provide a recognizable sync signal at least 1 ½ bit periods must have a constant signal, and, therefore, when the sync signal is transmitted two pulses will be missing from the generated pulse train.

Figure 3:
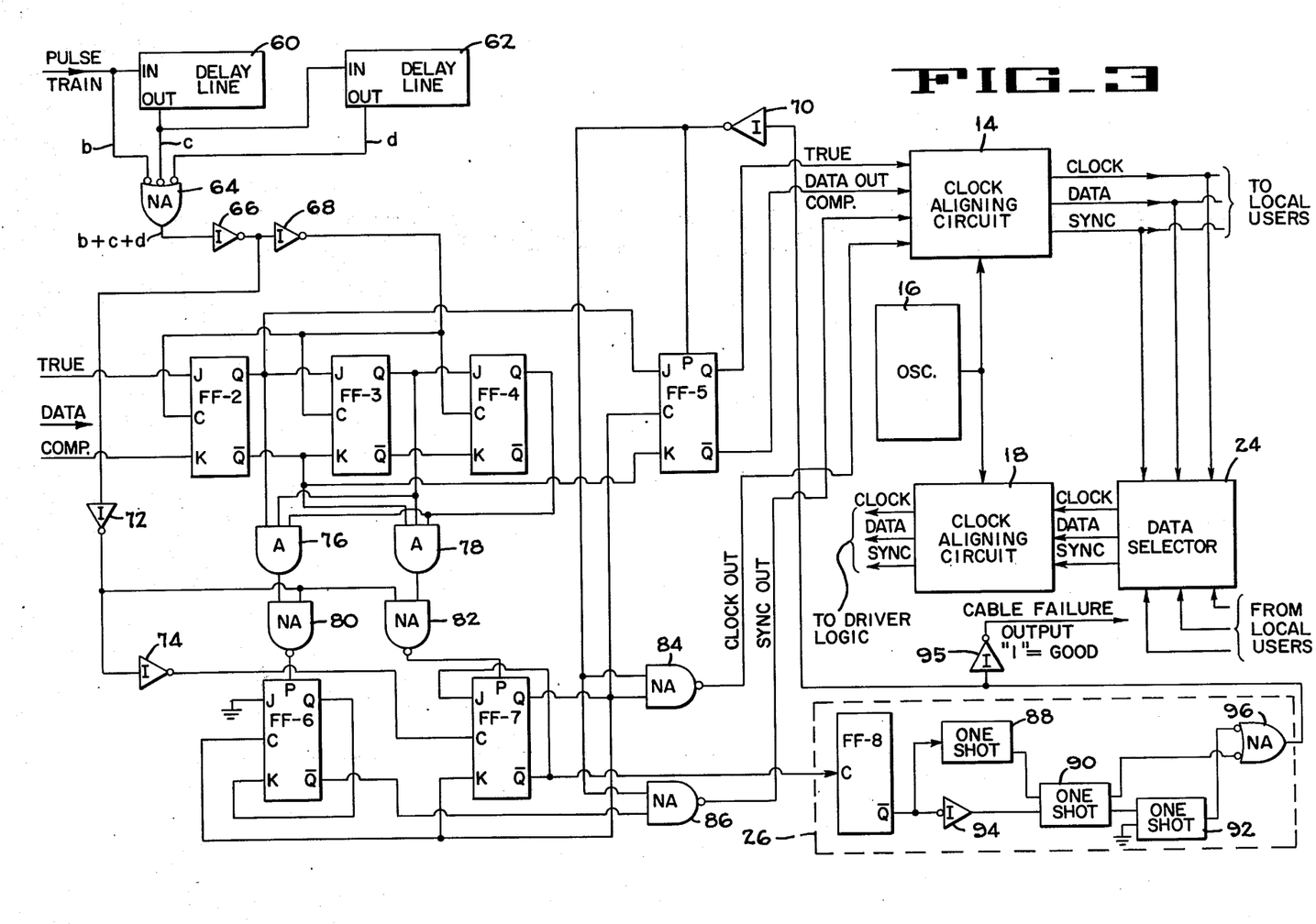
FIG. 3 is a schematic diagram of certain components of the circuitry of FIG. 1 particularly showing, in detail, a portion of the receiver logic circuitry and the cable failure detector circuitry.

FIG. 3 shows the major portion circuitry 12 and its connections to the clock aligning circuits 14 and 18, the local clock or oscillator 16, and the data selector circuitry 24. To synthesize the clock from the received data, the pulse train that was generated in the circuitry shown in FIG. 2 is directed serially to a pair of delay line chips 60 and 62 with the pulse train input signal and the output of each of the delay line chips being provided as inputs to a NAND gate 64 which is wired to provide an "or" function so that the output therefrom will comprise a continuous 20 megahertz signal even though as many as two pulses may have been missing from the pulse train input. This is illustrated diagrammatically in FIG. 5 wherein waveform (a) represents the received data and wherein waveforms (b), (c) and (d) represent the inputs to the gate 64. The combination of these signals $(b+c+d)$ is seen as the 20 megahertz clock signal.

The 20 megahertz clock signal is directed through inverters 66 and 68 and applied to the clock inputs of a series of flip-flops FF-2, FF-3 and FF-4. The true and complement forms of the data from the adjustable filter and logic level converter circuitry (FIG. 2) are directed to the J-K inputs of the first flip-flop FF-2 and, as the flip-flops FF-2, FF-3 and FF-4 are serially wired together, the data is successively transferred to flip-flops FF-3 and FF-4 on succeeding 20 megahertz clock pulses.

The purpose of the short register comprised of the three serially connected flip-flops FF-2, FF-3 and FF-4 is to detect the presence of the sync signal which will provide a unique output condition for this register wherein the Q outputs of each of the three flip-flops will be high. In this, and only this, case an AND gate 76 will be enabled to provide an enabling signal for a NAND gate 80 which, in turn, provides a preset signal to a flip-flop FF-6 upon the subsequent rising edge of the 20 megahertz clock pulse through the inverter 72 (i.e., after a 25 nanosecond delay). Presetting of flip-flop FF-6 causes its $\overline{Q}$ output to go low which, in turn, causes the output of NAND gate 86 to go high initiating the sync output signal. The clock input for the flip-flop FF-6 is provided by the Q output of a flip-flop FF-7 which is wired so as to divide the 20 megahertz pulses through inverters 72 and 74 and thereby reproduce the data clock signal. Thus, the $\overline{Q}$ output of flip-flop FF-6 remains high for one bit period (100 nanoseconds); this comprises the sync output signal.

The clock signal, as previously mentioned, is provided by output of the flip-flop FF-7 which divides by two the 20 megahertz signal and provides a 10 megahertz pulse signal to a NAND gate 84. This reformation of the clock signal with the 20 megahertz signal is illustrated diagrammatically in (e) and (f) of FIG. 5. The other inputs of both NAND gates 84 and 86 will always be high (to permit output signals therefrom) so long as the cable failure detector signal from the circuitry 26 is low, said signal being inverted by the inverter 70 and applied to the gates 84 and 86. It will also be noted that the clock output signal will go low 50 nanoseconds after the sync signal goes high since AND gate 78 will be enabled to enable NAND gate 82 and deliver a preset signal to the flip-flop FF-7 which will set its Q output high. Thus, the rising edges of the sync signal and the clock signal will be in phase, which is the desired phasing for sending such signals to subscriber equipment.

It will be noted, with regard to FIG. 3, that the data signals (true and complement) are output from a flip-flop FF-5 which is directly tied in series with the flip-flop FF-2. The flip-flop FF-5 is clocked with the reformed clock signal from the Q output of Flip-flop FF-7. Thus, the data pattern will follow immediately when the sync signal goes low. It will also be noted that the clock signal strobes the data on its falling edge which is 25 nanoseconds before the end of the bit period (or in the middle of the bit information indicating portion of the bit period). This strobing, which is accomplished by flip-flop FF-5, is illustrated diagrammatically by (a) and (f) in FIG. 5.

Flip-flop FF-5 will remain operative to provide a data output signal unless a cable failure is detected in which case the present input from inverter 70 locks out the operation of FF-5 to prevent false data from being transmitted.

FIG. 3 also shows, in detail, the cable failure detector circuitry 26. This circuitry receives an input from the $\overline{Q}$ output of flip-flop FF-7 whereby it continuously receives 10 megahertz pulses. The input flip-flop FF-8 operates to divide the frequency of the pulses by two so that 5 megahertz pulses will be transferred to a one-shot circuit 88 and through an inverter 94 to a second one-shot circuit 90. The one-shot circuit 88 is set so that it will time out between pulses while the one-shot circuit 90 is set so that its output will remain high as long as continuous 10 megahertz pulses are received. The one-shot circuit 92, which is connected to the $\overline{Q}$ output of one-shot 90, will never be triggered so long as this signal stays low (i.e., one-shot 90 remains "on"). The $\overline{Q}$ output from one-shot 92 is connected to one of the inputs to NAND gate 96 whereby gate 96 continuously provides a low output signal to indicate that the clock pulses are being regularly received, i.e., that there is no cable failure. However, should either of the inputs to gate 96 change, the cable failure signal will be indicated through inverter 95, and this indicator signal will remain until a continuous string of clock pulses is again received.

Figure 4:
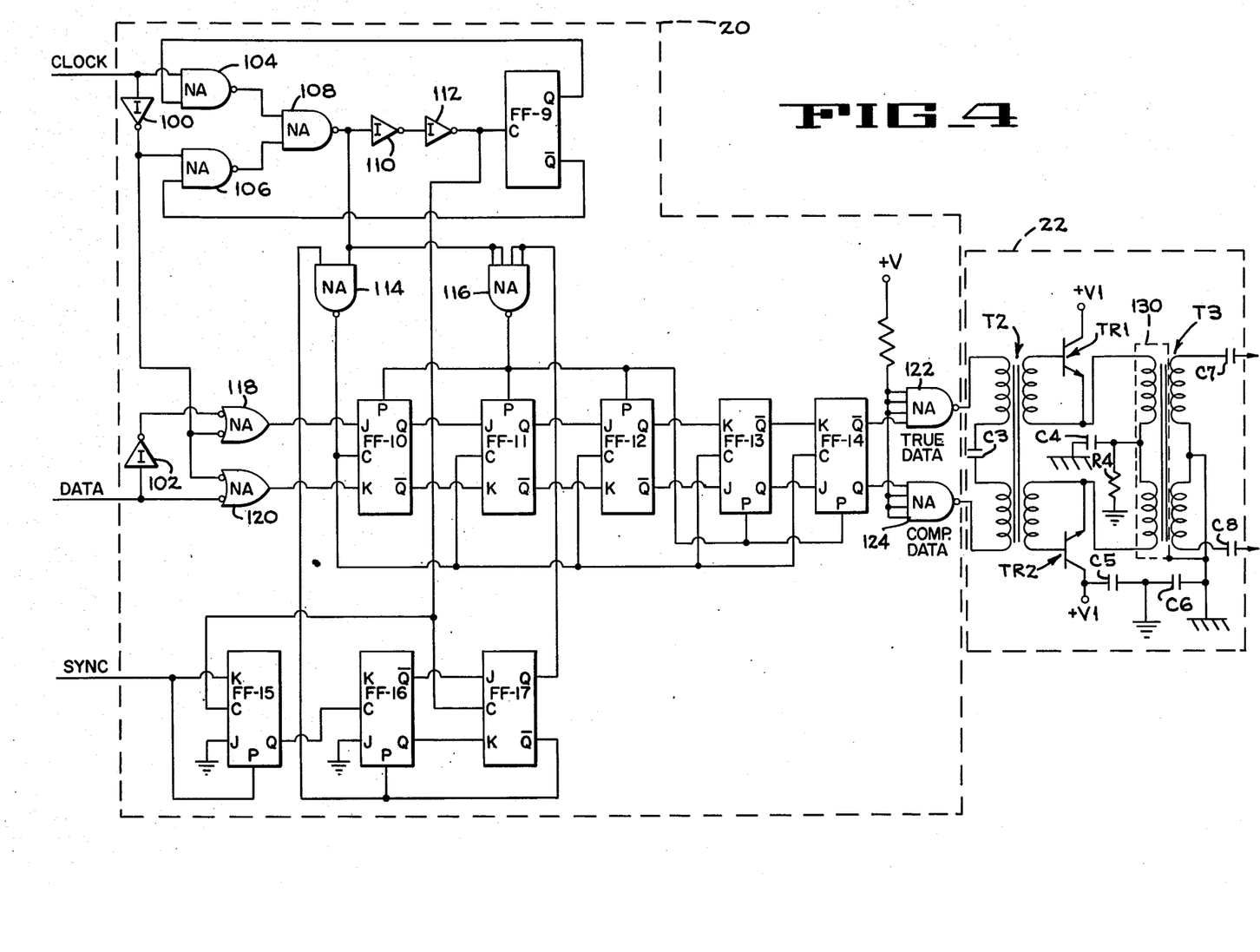
FIG. 4 is a schematic diagram illustrating the driver logic circuitry and the driver amplifier circuitry of the transmitter/receiver module of the present invention.

FIG. 4 illustrates the driver logic circuitry 20 and the driver amplifier 22 which receive the separate clock, data and sync signals from the clock aligning circuit 18 and which operate to modulate the data into a diphase NRZ format for transmission over a two-wire output line. In order to modulate the data a clock running at twice the frequency of the data clock is needed, and hence, a 20 megahertz clock signal is formed from the data clock signal by means of logic NAND gates 104, 106 and 108, inverters 100, 110 and 112, and a flip-flop FF-9, all as shown in FIG. 4. The frequency doubling circuitry operates in the same manner as the previously described frequency doubling circuitry in the receiver logic circuit 12 (FIG. 2) comprising gates 50, 52, 54, 56 and 58 and flip-flop FF-1. Thus, on each transition in the clock signal one of the NAND gates 104 or 106 will be enabled to raise the signal level at the clock input to the flip-flop FF-9 which signal level will fall approximately 25 nanoseconds later due to the reversal of the flip-flop FF-9 inputs to the gates 104 and 106 with the 25 nanosecond time period being determined by the delay times through the circuit elements. The 20 megahertz signals on input lines to a NAND gate 114 and a NAND gate 116.

In addition to the establishment of the 20 megahertz clock pulses to module the data, the driver logic circuitry 20 also provides the logic for establishing the output pattern for the sync pulse. It will be recalled that the sync pulse requires that one full bit period (100 nanoseconds) be low followed by a high signal for 1½ bit periods (150 nanoseconds). Thus, as the sync signal input line goes high to indicate a sync pulse, the present input to a flip-flop FF-15 is removed so that the Q output of FF-15 drops to clock a flip-flop FF-16 so that the Q output therefrom will go low. Twenty-five nanoseconds later on the application of a pulse from the 20 megahertz clock, flip-flop FF-17 is clocked to raise the signal on its Q output line and thereby enable the NAND gate 116. At the same time, the $\overline{Q}$ output of FF-17 presets the flip-flop FF-16 and disables NAND gate 114. When gate 116 is enabled, its output pulse presets each of the flip-flops FF-10, FF-11, FF-12, FF-13 and FF-14 in a predetermined pattern which defines the synchonizing pulse for the output line. Thus, the output from this chain of flip-flops or register, which is indicated in FIG. 4 as the "true data" signal delivered to a NAND gate 122, will be comprised of two lows followed by three highs. Thus, the output of flip-flops FF-13 and FF-14 are set low and the output of flip-flops FF-10, FF-11 and FF-12 are all set high. At a time 75 nanoseconds after the sync pulse first goes high, the foregoing pattern is shifted in the register (flip-flops FF-10 to FF-14) upon the reception of a clock pulse from the NAND gate 114, and the first bit period is thereby transferred to the output transmission line.

As the sync pulse is extinguished, the first data bit is provided on the data line and directed to NAND gate 120. The complement of the data is provided by an inverter 102 and directed to a similar NAND gate 118. Twenty-five nanoseconds after each data bit is received it is strobed by a clock pulse from the NAND gate 114 and transferred through the first flip-flop FF-10 in the output register, and, when the data bit has been transferred out of the last flip-flop FF-14, the transmission output line to go high or low in accordance with the regular diphase NRZ data transmission pattern previously described. The data received at the NAND gates 118 and 120 is thus continuously modulated by the 20 megahertz pulse train, and it is output from the driver logic circuitry through the NAND gates 122 and 124 to the driver amplifier 22.

The driver amplifier circuitry 22, as shown in FIG. 4, couples the data signal to the output transmission line through a pair of isolating transformers T2 and T3. A capacitor C3 is placed in the center of the primary winding of the first transformer T2 to maintain circuit symmetry, i.e., to balance the parasitic effects because of the high data transmission frequencies used with the circuitry of the present invention. The secondary windings of transformer T2 are coupled to a pair of transistors TR1 and TR2 which are provided with a supply voltage V1 and which operate to provide both a high current gain and a high voltage gain. The output transformer T3 provides isolation and couples the data signal through the capacitors C7 and C8 to the output transmission line. The primary of transformer T3 is shielded by means of a shield 130 which is directly tied to the chassis of the T/R module and which is also coupled through a capacitor C6 to the circuit ground. The primary of transformer T3 is referenced to the circuit ground by means of a center tap connection through a resistor R4. The center tap of transformer T3 is connected to the chassis ground through capacitor C4 and the supply voltage V1 is tied to the circuit ground through a capacitor C5 in order to prevent any ground loop currents from being transferred into the output transmission to degrade the data.

By the foregoing description it will be recognized that the transmitter/receiver module of the present invention provides a relatively simple and compact unit which can both transmit and receive serial digital data of the pulse coded binary type. The incoming data is demodulated to provide separate clock, sync and data signals, and such a signal format, as received from subscriber equipment, can be modulated in order to transmit said data in the appropriate serial form over the two-wire output transmission line. The output and input transmission line coupling means of the T/R module provide complete DC isolation, and the receiver section of the module includes a gain control means for automatically adjusting for varying signal strengths.

Although the best mode contemplated for carrying out the present invention has been herein shown and described, it will be apparent that modification and variation may be made without departing from what is regarded to be the subject matter of the invention.

What is claimed is:

1. A transmitter/receiver module for handling serial digital data comprising means for receiving said serial digital data on a two-wire input line; means for demodulating said data into a data signal, a clock signal and a synchronizing signal; an oscillator operative at generally the same frequency as the clock signal derived from said data; means for aligning said clock signal with the signal from said oscillator; output lines for each of said data signal, realigned clock signal and synchronizing signal; means for modulating said data signal, realigned clock signal and synchronizing signal or a data signal, clock signal and synchronizing signal which are input directly to said module, said modulation providing a single serial digital data signal; and means for transmitting said modulated signal over a two-wire output line.

2. A transmitter/receiver module according to claim 1 including means for aligning with the signal from said oscillator the clock signal of said data signal, clock signal and synchronizing signal which are input directly to said module.

3. A transmitter/receiver module according to claim 1 wherein said demodulating means includes means for producing a secondary clock signal at twice the frequency of the received data, register means for receiving said data, said secondary clock signal being connected to said register means to clock said data therethrough, means for monitoring said register means to detect the presence of said synchronizing signal in said data, means for dividing said secondary clock signal to produce said clock signal, means connected to said monitoring means for producing said synchronizing signal, and means for synchronizing said produced clock signal and said produced synchronizing signal with said data signal in a predetermined phase relationship.

4. A transmitter/receiver module according to claim 1 including gain control means for increasing or decreasing the signal provided to said demodulating means in accordance with the strength of the signal received on said input line so as to maintain a generally constant signal level through said module.

5. A transmitter/receiver module according to claim 4 wherein said gain control means includes an input filter and means for altering the frequency response of said input filter in accordance with the strength of the signal on said input line.

6. A transmitter/receiver module according to claim 1 including means for monitoring said received clock signal for providing an output signal indication of a failure in the input cable.

7. A transmitter/receiver module according to claim 1 wherein said modulating means comprises primary register means with the output of said primary register means being connected to said transmitting means, means for producing a secondary clock signal at twice the frequency of said realigned clock signal, said secondary clock signal being connected to said primary register means to clock said data signal therethrough, secondary register means for receiving said synchronizing signal, and means responsive to a predetermined condition of said secondary register means for presetting each of the bits in said primary register means to a predetermined pattern corresponding to the synchronizing signal in said serial digital data.

8. A transmitter/receiver module according to claim 1 wherein said means for transmitting said modulated signal includes a pair or transformers, and transistor amplifying means connected between said transformers for providing both a high current gain and a high voltage gain in said modulated signal.

9. Circuitry for receiving serial digital data on a two-wire input line, said circuitry including demodulating means comprising means for producing a secondary clock signal at twice the frequency of the received data, register means for receiving said data, said secondary clock signal being connected to said register means to clock said data therethrough, means for monitoring said register means to detect the presence of a synchronizing signal in said data, means for dividing said secondary clock signal to produce a primary clock signal, means connected to said monitoring means for producing a synchronizing signal, and means for providing said primary clock signal, said synchronizing signal and a data signal on three separate lines.

10. Circuitry according to claim 9 including an oscillator operative at generally the same frequency as said primary clock signal, and means for aligning said primary clock signal with the signal from said oscillator.

11. Circuitry according to claim 9 including gain control means for increasing or decreasing the signal provided to said demodulating means in accordance with the strength of the signal received on said input line so as to maintain a generally constant signal level through said circuitry, said gain control means including an input filter and means for altering the frequency response of said input filter in accordance with the strength of the signal on said input line.

12. Circuitry according to claim 9 wherein said means for producing said secondary clock signal includes means for producing a train of pulses of predetermined width with a pulse being produced for each transition in the received data, means for producing a delay signal comprising said pulse train delayed for a predetermined time period, and means for combining said pulse train and said delay signal to form said secondary clock signal with no pulses missing therefrom.

13. Circuitry for transmitting serial digital data over a two-wire transmission line from digital data received on separate clock signal, synchronizing signal and data signal lines; said circuitry including modulating means comprising primary register means, means for producing a secondary clock signal at twice the frequency of said received clock signal, said secondary clock signal being connected to said primary register means to clock said data signal therethrough, secondary register means for receiving said synchronizing signal, and means responsive to a predetermined condition of said secondary register means for presetting each of the bits in said primary register means to a predetermined pattern corresponding to the synchronizing signal in said serial digital data transmitted on said transmission line.

14. Circuitry according to claim 13 wherein said means for transmitting said serial digital data includes a pair of transformers, and transistor amplifying means connected between said transformers for providing both a high current gain and a high voltage gain in said output signal.

* * * * *

UNITED STATES PATENT AND TRADEMARK OFFICE
CERTIFICATE OF CORRECTION

PATENT NO. : 4,038,494
DATED : July 26, 1977
INVENTOR(S) : GEORGE W. MILLER, MARK D. RYAN, BILL H. NIEMI It is certified that error appears in the above-identified patent and that said Letters Patent are hereby corrected as shown below:

Column 2 - line 50 change "proceding" to --preceding--.

Column 3, line 12 after "had" insert --for--.

Column 3, line 21 after "September" change "19" to --14--.

Column 4, line 9 change "increased" to --increases--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks